United States Patent Office 2,773,919
Patented Dec. 11, 1956

2,773,919

METHOD OF PRODUCING ODORLESS NAPHTHAS

Allen F. Millikan, Evanston, Ill., assignor to The Pure Oil Company, Chicago, Ill., a corporation of Ohio No Drawing. Application December 28, 1953, Serial No. 400,821

8 Claims. (Cl. 260—683.4)

The present invention relates to a process for the purification of hydrocarbons, particularly the removal of characteristic odors from alkylated products to produce odorless naphthas.

The presence of odors, color, gum-forming constituents, etc., in hydrocarbons, particularly hydrocarbons formed as the result of syntheses, has been attributed to many different sources including the sulfur compounds and certain oxidation products therein. Many processes have been developed for the purification of hydrocarbons particularly through solvent extraction using alcohols, glycols, ethers, sulfur dioxide, phenols, esters, and similar solvents. The success of such processes ha been dependent on many factor—the source material to be purified, the solvent used, the type or degree of purification desired, and the conditions of extraction employed. It is known that naphthas boiling in the gasoline range may be stabilized against color formation and gum deposition by solvent extraction with polyhydric aliphatic alcohols such as ethylene glycol or glycerol. Electrical insulating oils may be treated with solvents of the type just mentioned to remove oxidizable impurities which are detrimental during the use of such oils in transformers. Aromatics may be selectively removed from mixture with non-aromatic hydrocarbons by treatment of the mixture with a mixture of water and a hydroxy or polyhydroxy organic compound. Dihydric alcohols containing at least one ether group such as diethylene glycol, triethylene glycol, etc., may be used to separate paraffinic constituents from aromatic constituents present in naphthas, kerosenes, and light gas oils.

In spite of profuse prior art on the subject of solvent extraction as a means of purification of hydrocarbon mixtures, the production of odorless naphthas for use in the cleaning, paint, insecticide, and varnish making industries has remained a problem. The odor tests applied to naphthas of these types, although purely qualitative and based on the olfactory nerve sensitivity, are nevertheless exceedingly sensitive since the criterion is no odor whatsoever or the absence of the odor which is characteristic of naphthas. Redoval of odors from the more complex hydrocarbon mixtures, particularly the production of such acceptable odorless naphthas from alkylate hydrocarbons produced by the catalytic reaction of paraffinic hydrocarbons with olefinic hydrocarbons at relatively low temperatures, represents a particularly acute problem since these alkylate hydrocarbons contain odorous constituents that are difficult to remove. Such processes produce alkylate fractions in the boiling range of about 350° to 600° F., which are used as insecticide bases, ink oils, and the formation of naphthas for the cleaning and paint industries. The saleability and utility of such products are directly influenced by the presence or absence of detectable odors therein.

The present invention is predicated on the discovery that a particular group of solvents is useful in extracting characteristic odor from alkylate hydrocarbons or alkylate fractions boiling in the range of 350° to 600° F., such extraction taking place without the necessity of the relatively critical conditions generally used with other solvents. It has been found that the group of solvents comprising dihydric and trihydric alcohols having from 2 to 6 carbon atoms in the molecule wherein the hydroxyl groups are linked to adjacent carbon atoms are particularly effective. Dihydric alcohols falling within this definition include ethylene glycol ($HOCH_2CH_2OH$), propylene glycol ($CH_3CHOHCH_2OH$), 1,2-butylene glycol ($CH_3CH_2CHOHCH_2OH$), 2,3-butylene glycol ($CH_3CHOHCHOHCH_3$), isobutylene glycol (($CH_3)_2COHCH_2OH$), tetramethylethylene glycol or pinacol (($CH_3)_2COHCOH(CH_3)_2$). The trihydric alcohol includes glycerol ($CH_2OHCHOHCH_2OH$).

Accordingly, it is the primary object of this invention to provide a process for treating alkylate hydrocarbons and alkylate fractions boiling in the range of 350° to 600° F. to remove characteristic naphtha odor to form products suitable for use as solvents in varnish, paint, ink, insecticides, and similar materials.

It is a second object of this invention to provide a process for the production of odorless naphthas from alkylate hydrocarbons having a boiling range of 350° to 600° F. by solvent extraction with a solvent selected from the group consisting of dihydric and trihydric alcohols having 2 to 6 carbon atoms in the molecule wherein the hydroxyl groups are attached to adjacent carbon atoms.

Other objects and advantages of the invention will become apparent as the description thereof proceeds.

In order to demonstrate the invention, an alkylate having a boiling range of 372° to 573° F. was treated in a series of tests. The parent alkylate was prepared by reacting isobutane with isobutylene at 30° to 50° F. using a sulfuric acid catalyst. The 372° to 573° F. fraction before treatment had an odor which made it unacceptable for use as an odorless naphtha and exhibited a strong characteristic naphtha odor.

*Experiment 1.*—Equal volumes of ethylene glycol and the above-described, heavy, odorous alkylate fraction having a boiling range of 372° to 573° F. were shaken in a separatory funnel for one minute. The ethylene glycol solvent phase was withdrawn and the hydrocarbon raffinate phase was washed three times with water. The raffinate product of this treatment was of excellent odor, free from characteristic naphtha odor, whereas the charge material had an unacceptable odor. The water wash steps of such experiments are merely an expedient for phase separation and accomplish no odor removal.

Substantially anhydrous methanol has some ability to improve odor but imparts a sweetish odor to the product, which is often found to be objectionable. Furthermore, the addition of small amounts of water rapidly reduces the odor-removing ability of methanol, but such amounts do not affect the di- and trihydric alcohols of this invention. Further, aliphatic monohydric alcohols other than methanol have been found to be unsatisfactory as solvents because they are either too miscible with the naphtha or the alcohol itself imparts an undesirable odor to the naphtha. Dilution of ethyl alcohol with water to yield an alcohol concentration of about 91 percent, thereby rendering it immiscible with naphtha, produced a solvent reagent which was inferior to either anhydrous methanol or the polyhydric alcohols of this invention in the extraction of odor from naphthas. Dilution of ethyl alcohol to 75 percent alcohol content resulted in a material which was practically worthless in extracting odor.

Although the use of anhydrous methanol is effective in removing the characteristic naphtha odor, it does impart a sweet odor to the alkylate fractions of the boiling range concerned. This sweet odor is found to be objectionable by some consumers of the naphtha products. This objection does not apply to naphthas treated with the dihydric or trihydric alcohols falling within the class definition set forth. By characteristic naphtha odor as used in this specification is meant that odor normally associated with naphtha-type hydrocarbons as indicated by the bottle odor, wet odor, and residual odor tests as detected by experts among producers, marketers, and consumers.

In detecting the odor, three criteria are followed, each depending upon the sensitivity of the olfactory nerve, namely: bottle odor, wet odor, and residual odor. The bottle odor is the smell detected upon opening a container of the naphtha and represents most probably the content of light odorous materials present. In determining the wet odor, a portion of the naphtha is poured upon a filter paper and the odor thereof noted. The residual odor comprises the odor remaining on the filter paper after evaporation to dryness of the components from the filter paper.

Additional experiments conducted to show the efficacy of ethylene glycol, propylene glycol, and glycerol are as follows:

*Experiment 2.*—One volume of special mineral spirits (of 342°–378° F. boiling range), produced by pilot plant fractional distillation of a heavy alkylate (of 342°–536° F. boiling range) was treated by shaking for one minute with one volume of 100% ethylene glycol. The treated mineral spirits was thoroughly water washed and filtered through filter papers. Critical tests before and after treatment are tabulated below:

*Special mineral spirits*

|  | Before treatment | After treatment with 100% ethylene glycol |
| --- | --- | --- |
| Odor | Poor | Excellent. |
| Peroxide number [1] | 5.1 | 2.8. |

[1] Grams of active oxygen per 1,000 liters.

The reduction in peroxide number is significant since experience has shown that increase in peroxide number ordinarily accompanies deterioration in odor and it has been observed that poor odors ordinarily develop when peroxide numbers exceed 4.0 to 5.0.

*Experiment 3.*—A number of three-stage treatments of special mineral spirits with various concentrations of ethylene glycol were carried out using the following technique: Two volumes of mineral spirits (the charge naphtha of Experiment 2 above) were shaken for one minute in a test tube with one volume of ethylene glycol. The mineral spirit was decanted to another test tube where it was shaken for one minute with one volume of ethylene glycol. The mineral spirit was decanted to a third test tube where it was shaken for one minute with one volume of ethylene glycol. The raffinate was decanted, water washed, and filtered through filter paper. Various concentrations of ethylene glycol in water were used in this work. The results of these extractions follow:

|  | Odor |
| --- | --- |
| Untreated special mineral spirits | Poor. |
| After three-stage treatment with 100% ethylene glycol. | Excellent. |
| After three-stage treatment with 98% ethylene glycol. | Do. |
| After three-stage treatment with 95% ethylene glycol. | Do. |
| After three-stage treatment with 90% ethylene glycol. | Good. |
| After three-stage treatment with 75% ethylene glycol. | Borderline. |
| After three-stage treatment with 50% ethylene glycol. | Do. |
| After three-stage treatment with 25% ethylene glycol. | Do. |

*Experiment 4.*—Further experiments were conducted using the procedure given under Experiment 3. In this work, propylene glycol and glycerol were used as solvents and the Special Mineral Spirits used in Experiment 2 were employed. The results follow:

|  | Odor |
| --- | --- |
| Untreated special mineral spirits | Poor. |
| After propylene glycol treatment | Good. |
| After glycerol treatment | Do. |

*Experiment 5.*—Further work was conducted in the manner of Experiment 3. Heavy alkylate (from which the mineral spirits of Experiment 2 were derived) was treated by propylene glycol and glycerol, respectively. The results follow:

|  | Odor |
| --- | --- |
| Untreated heavy alkylate | Borderline. |
| Heavy alkylate after propylene glycol treatment. | Excellent. |
| Heavy alkylate after glycerol treatment | Do. |

In addition to the embodiments of the invention shown by the experiments, it is contemplated that mixtures of the proposed solvents may be used and continuous countercurrent techniques employed instead of the batch operation shown. In general, the ratio of solvent to alkylate can be within the range of about 1.0 part of solvent to 0.5 to 20 parts of alkylate. The application of countercurrent techniques would allow considerable reduction of the solvent/alkylate ratio because of the intimate contact obtained and recycling of the solvent phase.

The alkylate fractions with which this invention is concerned are prepared by reaction of a saturated paraffin hydrocarbon as isobutane with the following olefins: n-butylenes, isobutylene, isobutylene polymers and codimer. The charge ratio of paraffin to olefin is between 3 and 10 and sulfuric acid, of approximately 90–98 percent titratable acidity, is used as the catalyst. The ratio of sulfuric acid to hydrocarbon is about 1 to 1. The temperature of the reaction is about 30° to 50° F. Alkylates produced by this reaction contain a predominance of branched-chain saturated hydrocarbons and contain a very small amount of olefins.

What is claimed is:

1. A method of removing the characteristic naphtha odor associated with organic peroxide forming and containing compounds from synthetic alkylate hydrocarbons having a boiling range within about 350° to 600° F. by solvent extraction with a solvent selected from the group consisting of dihydric and trihydric alcohols having 2 to 6 carbon atoms per molecule wherein the hydroxyl groups are attached to adjacent carbon atoms and mixtures thereof, followed by separation of the hydrocarbon phase and water washing.

2. The method in accordance with claim 1 in which the solvent is ethylene glycol.

3. The method in accordance with claim 1 in which the solvent is propylene glycol.

4. The method in accordance with claim 1 in which the solvent is 2,3-butylene glycol.

5. The method in accordance with claim 1 in which the solvent is isobutylene glycol.

6. The method in accordance with claim 1 in which the solvent is glycerol.

7. The method in accordance with claim 1 in which the alkylate is produced by the alkylation of isobutane with butylene in the presence of sulfuric acid at 30° to 50° F.

8. The method in accordance with claim 1 in which the alkylate has a boiling range of 372° to 573° F.

References Cited in the file of this patent

UNITED STATES PATENTS

| 2,013,663 | Malisoff | Sept. 10, 1935 |
| 2,414,626 | Allen | Jan. 21, 1947 |